United States Patent
Horowitz et al.

(10) Patent No.: US 8,094,430 B2
(45) Date of Patent: Jan. 10, 2012

(54) CAPACITORS, COUPLERS, DEVICES INCLUDING SAME AND METHODS OF MANUFACTURING SAME

(76) Inventors: Harvey J. Horowitz, Monroe, NY (US); Bernard Horowitz, Monroe, NY (US)

( * ) Notice: Subject to any disclaimer, the term of this patent is extended or adjusted under 35 U.S.C. 154(b) by 264 days.

(21) Appl. No.: 11/962,957

(22) Filed: Dec. 21, 2007

(65) Prior Publication Data

US 2008/0273288 A1 Nov. 6, 2008

Related U.S. Application Data

(60) Provisional application No. 60/871,702, filed on Dec. 22, 2006.

(51) Int. Cl.
*H01G 4/06* (2006.01)
(52) U.S. Cl. ............... 361/313; 361/311; 361/308.1; 361/306.1; 361/306.3; 361/321.2
(58) Field of Classification Search .......... 361/313, 361/311, 312, 301.4, 306.1, 306.3, 321.1, 361/321.2, 308.1, 309
See application file for complete search history.

(56) References Cited

U.S. PATENT DOCUMENTS

| | | | | |
|---|---|---|---|---|
| 5,757,611 A | * | 5/1998 | Gurkovich et al. | 361/321.4 |
| 6,430,025 B2 | * | 8/2002 | Naito et al. | 361/303 |
| 6,483,692 B2 | * | 11/2002 | Figueroa et al. | 361/308.1 |
| 6,606,237 B1 | * | 8/2003 | Naito et al. | 361/306.3 |
| 6,751,087 B2 | * | 6/2004 | Greenwood et al. | 361/533 |
| 6,816,356 B2 | * | 11/2004 | Devoe et al. | 361/309 |

* cited by examiner

*Primary Examiner* — Nguyen T Ha
(74) *Attorney, Agent, or Firm* — DLC Patents, PLLC; Dustin L. Call

(57) ABSTRACT

Capacitors are provided comprising a first plate, a second plate spaced from the first plate and a dielectric between the first and second plates. In certain embodiments the plates are arranged generally opposite each other and each is shaped in a periodically repeating pattern that is spatially out of phase with the other so that misregistration of the plates is compensated. In certain embodiments, a floating equipotential conductor is positioned between the plates and has a larger dimension than a corresponding dimension of the plates so that misregistration of the plates is compensated. Methods of manufacturing the capacitors are also provided.

6 Claims, 6 Drawing Sheets

CAPACITORS, COUPLERS, DEVICES INCLUDING SAME AND METHODS OF MANUFACTURING SAME

This application claims the benefit of U.S. provisional patent application No. 60/871,702, filed Dec. 22, 2006 in the names of Harvey J. Horowitz and Bernard Horowitz.

Capacitors, couplers, devices including same and methods of manufacturing the foregoing are disclosed.

BACKGROUND

A wide variety of electronic devices are manufactured using processes that involve the placement or formation of device structures in a predetermined relationship to one another within close tolerances. Among such devices are capacitors, couplers and devices including one or more of these devices, in which two or more conductors must be placed or formed in close alignment in order to produce a device having predetermined electrical characteristics within a range of acceptable tolerances. Those devices that fail to exhibit such characteristics within such tolerance range must be discarded. The greater the proportion of unacceptable to acceptable devices, the more expensive the acceptable devices become, and the lower the manufacturer's gross profit on the sale of the devices.

As an example, coupled transmission lines and hybrid couplers have been implemented by two elongated rectangular metal plates having the same dimensions and separated by a dielectric layer. The goal of the manufacturing process for producing such devices is to align the plates as closely as possible both in their longitudinal and lateral directions to provide a capacitance as close as possible to design parameters. However, due to mis-registration of the masks or other devices used to form or position the plates, they can become misaligned in both in the longitudinal and lateral directions. Such misalignment results in a deviation of the capacitance of the capacitor formed by the opposing plates, which can exceed the design tolerance, resulting in rejection of the device.

DISCLOSURE

Various features and aspects of the capacitors, couplers, devices and methods are disclosed below in conjunction with the accompanying drawings, in which:

FIGS. 1A and 1B are used to illustrate the reduced sensitivity of the

Figure 1:
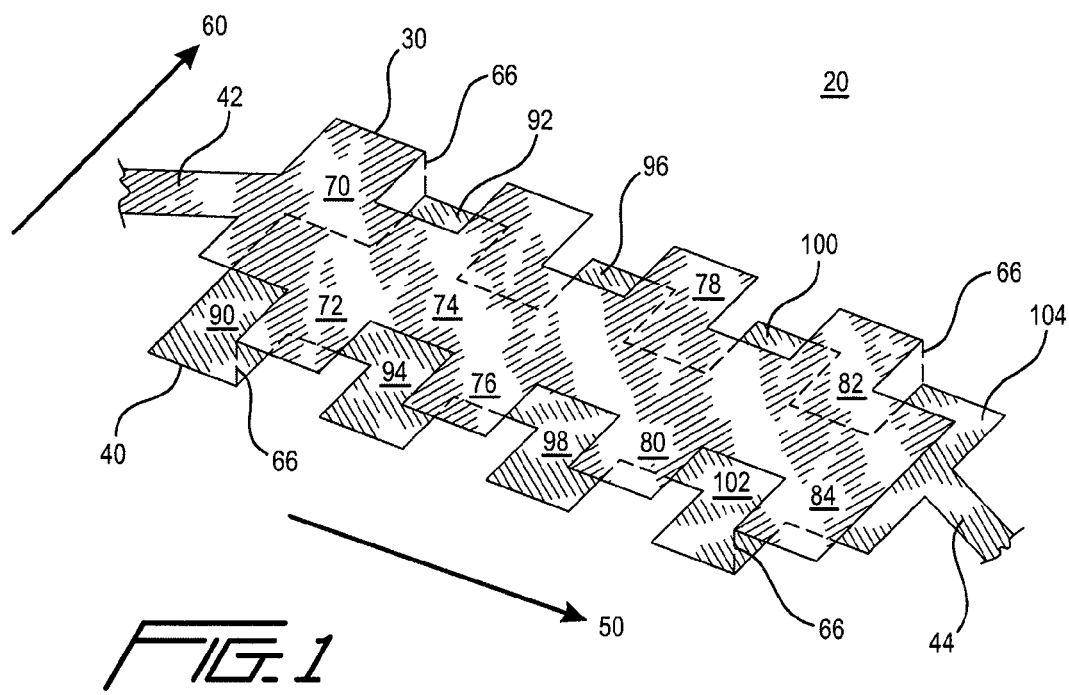
FIG. 1 is a three-dimensional view illustrating an embodiment of a capacitor having plates structured to reduce sensitivity of the device's capacitance to misalignment of the plates.

With reference to FIG. 1, a capacitor 20 comprises an upper plate 30 and a lower plate 40 separated from the upper plate 30 by a dielectric (not shown for purposes of simplicity and clarity in FIG. 1). In certain embodiments, the dielectric comprises a gas, such as air, or a liquid, such as oil, or a vacuum. In certain embodiments in which the plates 30 and 40 of capacitor 20 are formed on a substrate, the dielectric material comprises a solid, such as glass, ceramic or polymer. A conductor 42 extends from one end of plate 30, while a conductor 44 extends from an end of plate 40 opposite the end of plate 30 from which conductor 42 extends. Conductors 42 and 44 provide leads for forming connections with the plates 30 and 40.

It will be seen from FIG. 1 that plates 30 and 40 extend longitudinally in a direction 50 and in a lateral direction 60 perpendicular to the longitudinal direction 50 and are generally aligned in a vertical direction, as indicated by dashed lines 66. It will also be seen that upper plate 30 comprises a plurality of generally rectangular sections 70, 72, 74, 76, 78, 80, 82 and 84 longitudinally displaced from each other and arranged in sequence along the longitudinal direction 50, while lower plate 40 comprises a plurality of generally rectangular sections 90, 92, 94, 96, 98, 100, 102 and 104 longitudinally displaced from each other and extending in sequence along the longitudinal direction 50. In this embodiment, each of the generally rectangular sections 70, 72, 74, 76, 78, 80, 82 and 84 is displaced in the lateral direction from each adjacent one of such sections of upper plate 30, while each of the generally rectangular sections 90, 92, 94, 96, 98, 100, 102 and 104 is displaced in the lateral direction from each adjacent one of such sections of lower plate 40. It will also be appreciated that the pattern of the rectangular sections of upper plate 30 is generally symmetrical, as is that of the rectangular sections of lower plate 40, and that each such pattern is defined by a periodic waveform extending along the longitudinal direction 50, such that each rectangular section has the same length and width. The waveform defining the patterns of the rectangular sections of the upper and lower plates 30 and 40 of FIG. 1 is a square wave, although it will be seen that the patterns of other embodiments of capacitors and couplers are defined by sinusoidal waveforms, linear combinations of sinusoidal waveforms, triangular waveforms and/or ramps. In general, any periodic pattern may be employed.

It is also evident from FIG. 1 that the waveform defining the pattern of upper plate 30 is offset from the waveform defining the pattern of lower plate 40 by approximately π radians. It will be seen, as explained below in connection with FIGS. 1A and 1B, that misalignment of the plates 30 and 40 in either or both of the directions 50 and 60, within limits, results in very little change in the total area by which plates 30 and 40 overlap. Since, in general, the capacitance formed by plates 30 and 40 is dominated by the parallel plate capacitance which is proportional to the overlapping area between the plates 30 and 40, misalignment of the plates, within limits, has an advantageously minor effect on the overall capacitance formed by plates 30 and 40 of the FIG. 1 embodiment.

Figure 1A:
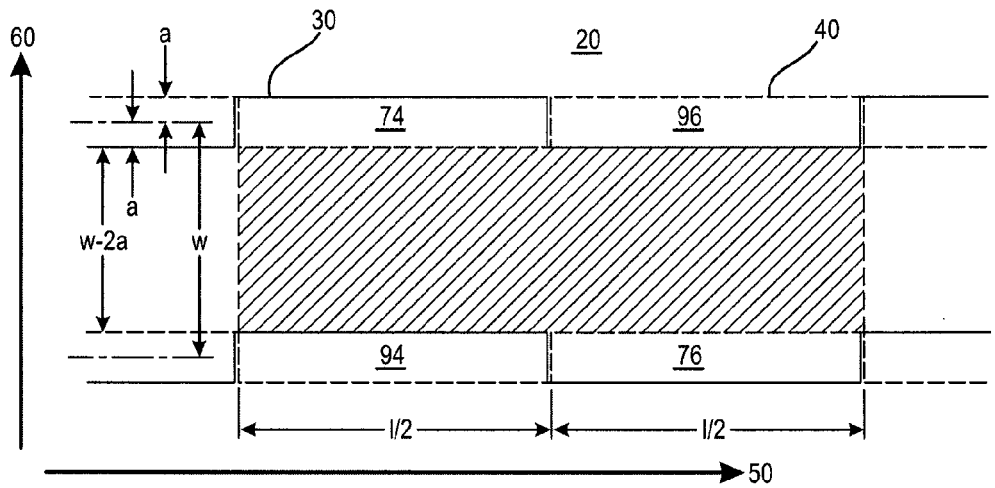

FIG. 1A illustrates the case in where plates 30 and 40 are aligned both in the direction 60 and the direction 50, so that the periodic patterns formed by areas 74, 76, et al., of plate 30 are π radians out of phase with the periodic pattern formed by areas 94, 96, et al. of plate 40. In this case the total overlapping area of the plates within an extent of 2π radians along direction 50 can be represented by the dimensions illustrated in FIG. 1A as follows: (w−2a)(l)=w(l)−2a(l).

Figure 1B:
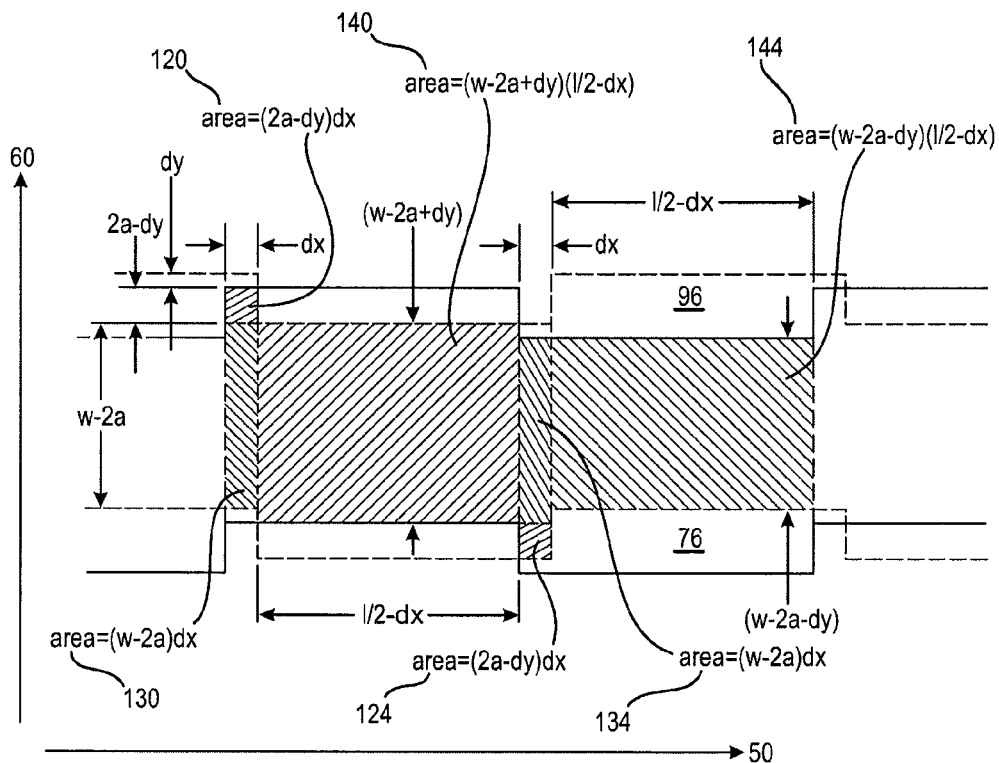

FIG. 1B illustrates the case where the plates 30 and 40 are offset by dx in the direction 50 and by dy in the direction 60. Here, the total overlapping area within an extent of 2π radians along direction 50 can be expressed as the sum of six sub-areas: (1) two sub-areas 120, 124, each equal to (2a−dy)(dx), (2) two sub-areas 130, 134, each equal to (w−2a)(dx), (3) a sub-area 140 equal to (w−2a+dy)(l/2−dx), and (w−2a−dy)(l/2−dx). The sum of all six areas may be expressed as (w−2a)(l)+4a(dx)−2(dy)(dx).

As an example, where the plates 30 and 40 are correctly aligned as shown in FIG. 1A, it is assumed that the dimensions shown in FIG. 1A are as follows: w=20 mils, a=4 mils, and l=100 mils. In this case, the overlapping area of a portion of the structure extending for 2π radians in the direction 50, is (w−2a)(l)=(20−2*4) * 100 mils$^2$=1200 mils$^2$. If, however, the plates 30 and 40 are misaligned so that dx=1 mil and dy=1 mil, the overlapping area becomes (w−2a)(l)+4a(dx)−2(dx)(dy) =[(20−2*4)(100)+(4*4*1)−(2*1*1)] mils$^2$=1214 mils$^2$. Thus, a misregistration of plates 30 and 40 of 1 mil in the direction 50 (the longitudinal direction) and 1 mil in the direction 60 (the lateral direction), results in a change of 1214/1200, or 1.17 percent in the overlapping area.

In a contrasting example, two rectangular plates are used in place of plates 30 and 40, each of the rectangular plates having a section 12 mils wide by 100 mils long to form the same overlapping area as the 2π radian-long portion of the FIG. 1 embodiment, that is, 1200 mils$^2$, when precisely aligned. If, however, the rectangular plates are misaligned to the same extent as plates 30 and 40 of the FIG. 1B example, that is, by 1 mil in the longitudinal direction and 1 mil in the lateral direction, the overlapping area becomes (11 mils)(99 mils)=1089 mils$^2$. Thus, a mis-registration of the two rectangular plates of l mil in the longitudinal direction and 1 mil in the lateral direction results in a change of 1089/1200, or 9.25 percent in the overlapping area, which is 9.25/1.17=7.9 times worse than the embodiment of FIG. 1 when misaligned to the same extent.

Thus, the capacitor structure of FIG. 1 substantially alleviates the problem of misalignment encountered in prior art devices, resulting in substantially higher manufacturing yields for capacitors and devices that incorporate them. The capacitor structure of FIG. 1 is particularly useful at lower frequencies where the abrupt changes along the peripheries of the plates 30 and 40 do not induce non-TEM modes in the structure which could adversely affect its useful properties. Typically, the periodicity should be less than about 5 percent of the shortest wavelength at which the structure will be used, although larger periodicities can be employed depending on the required parameters.

A capacitor comprises a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; and a dielectric separating the first plate from the second plate; the first plate having at least one first portion and at least one second portion displaced longitudinally from the at least one first portion, the at least one portion of the first plate being displaced in the second direction relative to the at least one second portion of the first plate; the second plate having at least one first portion and at least one second portion displaced longitudinally from the at least one first portion, the at least one portion of the second plate being displaced in the second direction relative to the at least one second portion of the second plate; the first portion of the first plate being aligned longitudinally at least partially with the first portion of the second plate to define a first opposing area; the second portion of the first plate being aligned longitudinally at least partially with the second portion of the second plate to define a second opposing area; the first portions of the first and second plates being displaced in the second direction from each other and the second portions of the first and second plates being displaced in the second direction from each other.

A capacitor comprises a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; and a dielectric separating the first plate from the second plate; the first plate and the second plate each having first longitudinally extending portions displaced laterally and longitudinally from second longitudinally extending portions thereof such that the first and second longitudinally extending portions form a periodic pattern of laterally displaced areas extending along the longitudinal direction; the periodic pattern of the first longitudinally extending portion being displaced by π radians from the periodic pattern of the second longitudinally extending portion with or without a further longitudinal displacement due to misalignment of the first and second plates.

A capacitor comprises a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; and a dielectric separating the first plate from the second plate; each of the first and second plates being displaced in the second direction in a periodically repeating pattern along an extent thereof in the first direction such that the periodic patterns of the first and second plates have a phase difference of substantially π radians along the first direction with or without a further displacement in the first direction due to misalignment of the first and second plates.

Figure 2A:
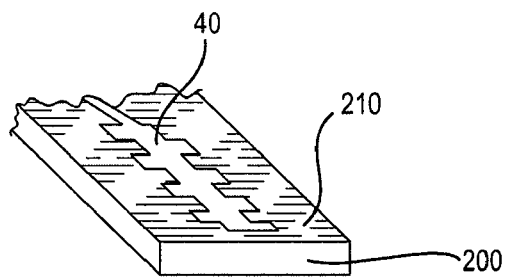
FIGS. 2A, 2B and 2C illustrate a process for manufacturing the capacitor of FIG. 1.
Figure 2B:
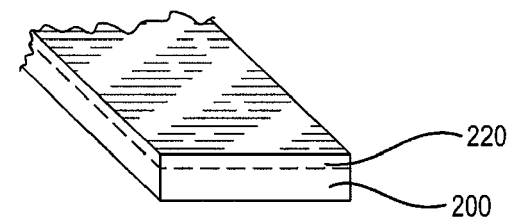
Figure 2C:
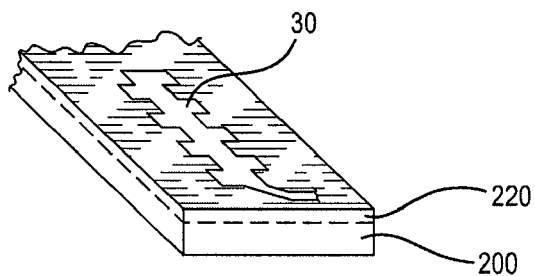

An embodiment of a process for manufacturing the capacitor of FIG. 1 is illustrated in FIGS. 2A, 2B and 2C. With reference first to FIG. 2A, in this particular embodiment, a dielectric substrate 200 has a surface 210 on which the lower plate 40 is formed with the use of a mask (not shown for purposes of simplicity and clarity) to define the shape of the lower plate 40. Deposition of a conductive material (such as gold, copper, silver, aluminum, other conductor or a semiconductor) to form lower plate 40 is carried out by physical vapor deposition, chemical vapor deposition, electrochemical deposition, evaporative deposition, sputtering, molecular beam epitaxi, or any other suitable process for deposition of a conductor or semiconductor. In certain embodiments, after the conductive material has been formed as a layer over surface 210, the desired shape of lower plate 30 is formed by chemical etching, plasma etching, ion beam milling, or other suitable subtractive process. In the alternative, lower plate 30 can be formed by any known additive process.

As illustrated in FIG. 2B, after lower plate 40 has been formed on surface 210, a layer 220 of dielectric material such as silicon dioxide, silicon nitride, ceramic or any other suitable dielectric, is formed over surface 210 by physical vapor deposition, chemical vapor deposition, electrochemical deposition, evaporative deposition, sputtering, molecular beam epitaxi, or any other suitable process for deposition of a dielectric material, which is closely controlled to produce a dielectric layer over lower plate 40 having a predetermined thickness.

With reference to FIG. 2C, the upper plate 30 is formed on the dielectric layer 220 so that it is aligned with lower plate 40 as shown in FIG. 1. Upper plate 30 is formed in the same manner as lower plate 40 or in a different manner by physical vapor deposition, chemical vapor deposition, electrochemical deposition, evaporative deposition, sputtering, molecular beam epitaxi, or any other suitable process for deposition of a conductor or semiconductor. As in the case of lower plate 30, upper plate 40 may be shaped by any suitable subtractive process, or in the alternative upper plate 40 can be formed by any known additive process.

In certain embodiments, a further dielectric layer is formed over upper plate 30. In certain ones of such further embodiments, a conductive ground plane is formed over such further dielectric layer and serves to produce a full stripline structure having very low dispersion. In certain embodiments, a further conductive ground plane is formed on a bottom surface of substrate 200 for the same purpose as the conductive ground plane that is formed over the further dielectric layer. In certain alternative embodiments, the dielectric substrate 200 is formed on a conductive substrate that acts as a conductive ground plane.

A method of manufacturing a capacitor comprises placing or forming a first plate in or on a dielectric substrate, the first plate extending longitudinally in a first direction in or on the dielectric substrate and in a second direction perpendicular to the first direction; placing or forming a dielectric material on the first plate; and placing or forming a second plate in or on the dielectric material, so that the second plate extends longitudinally in the first direction of the dielectric substrate and in the second direction perpendicular to the first direction, so that the second plate is separated from the first plate by the dielectric material and at least a portion of the second plate is arranged opposite at least a portion of the first plate; each of the first and second plates being displaced in the second direction in a periodically repeating pattern along an extent thereof in the first direction such that the periodic patterns of the first and second plates have a phase difference of substantially $\pi$ radians along the first direction with or without a further displacement in the first direction due to misalignment of the first and second plates.

Figure 3:
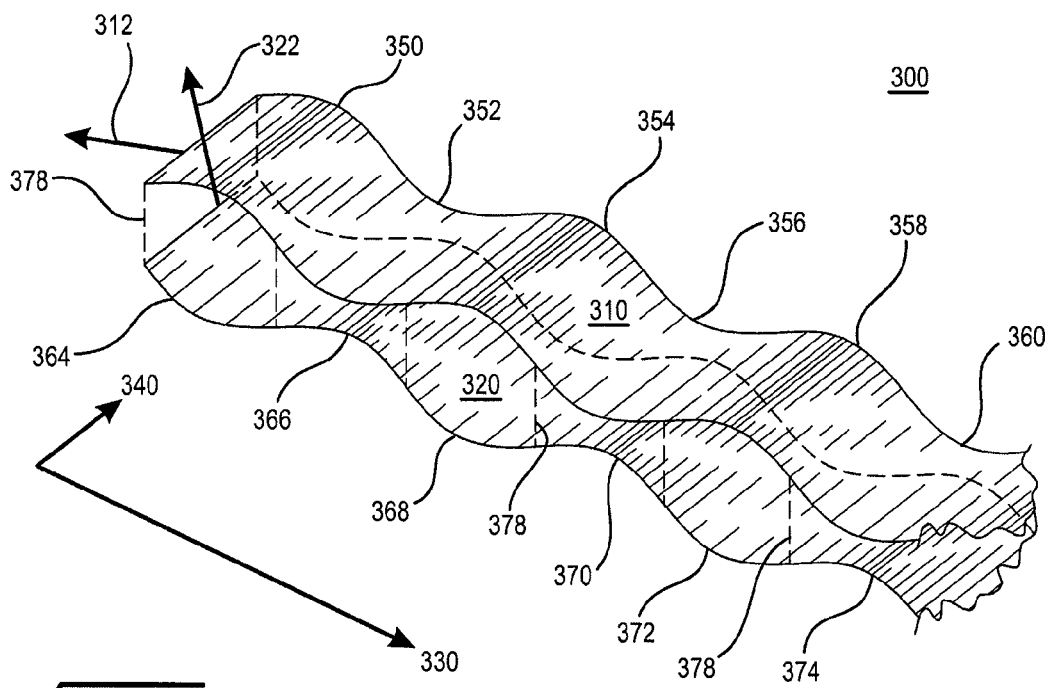
FIG. 3 is a three-dimensional view illustrating a further embodiment of a capacitor having plates structured to reduce sensitivity of the device's capacitance to misalignment of the plates.

FIG. 3 Illustrates a further embodiment of a capacitor 300 formed of opposing plates, that is, an upper plate 310 and a lower plate 320 separated from the upper plate 310 by a dielectric (not shown for purposes of simplicity and clarity in FIG. 3). As in the case of the embodiment of FIG. 1, the dielectric comprises a gas, such as air; a liquid, such as oil; a solid, such as glass, ceramic or polymer, or a vacuum. A conductor 312 extends from one end of plate 310 to provide an electrical connection to plate 310, while a conductor 322 extends from an end of plate 320 to provide an electrical connection thereto. In certain embodiments, connections are made to plates 310 and 320 at opposing ends thereof. In certain embodiments, connections are made to each of plates 310 and 320 at both ends thereof.

In general, the plates 310 and 320 are aligned both in a longitudinal direction 330 and in a lateral direction 340, so that at least a portion of upper plate 310 opposes lower plate 320. Each of plates 310 and 320 is formed to have longitudinally extending portions that are both longitudinally and laterally displaced from at least one adjacent such portion thereof. For example, plate 310 has a first longitudinally extending portion 350 that is displaced laterally from a second portion 352 thereof that is adjacent to first portion 350 but displaced therefrom longitudinally, so that together first and second portions 350 and 352 form a full cycle of a sinusoidal pattern of upper plate 310. A further cycle of such pattern is formed by longitudinally and laterally displaced, but adjacent portions 354 and 356, while a third is formed by longitudinally and laterally displaced, but adjacent portions 358 and 360.

Similarly, lower plate 320 has a first longitudinally extending portion 364 adjacent to a second portion 366 both longitudinally and laterally displaced from portion 364, so that portions 364 and 366 together form a full cycle of a sinusoidal pattern of lower plate 320. Longitudinally and laterally displaced, but adjacent portions 368 and 370 form a further cycle of the sinusoidal pattern, while a third is formed by longitudinally and laterally displaced, but adjacent portions 372 and 374. In general, where plates 310 and 320 are in alignment or registration, the sinusoidal patterns of plates 310 and 320 are displaced by one-half cycle, or $\pi$ radians, in the longitudinal direction, and the edges of plates 310 and 320 are aligned vertically at each half cycle, as indicated by dashed lines 378 in FIG. 3. In certain embodiments, the capacitor 300 is manufactured in the manner described above in connection with FIGS. 2A through 2C, while in certain embodiments, capacitor 300 is manufactured using a different manufacturing process.

It will be seen, as explained below in connection with FIGS. 3A and 3B, that misalignment of the plates 310 and 320 in either or both of the directions 330 and 340, within limits, results in very little change in the total area by which plates 310 and 320 overlap. Since, in general, the capacitance formed by plates 310 and 320 is dominated by the parallel plate capacitance which is proportional to the overlapping area between the plates, their misalignment, within limits, has an advantageously minor effect on the overall capacitance they form.

Figure 3A:
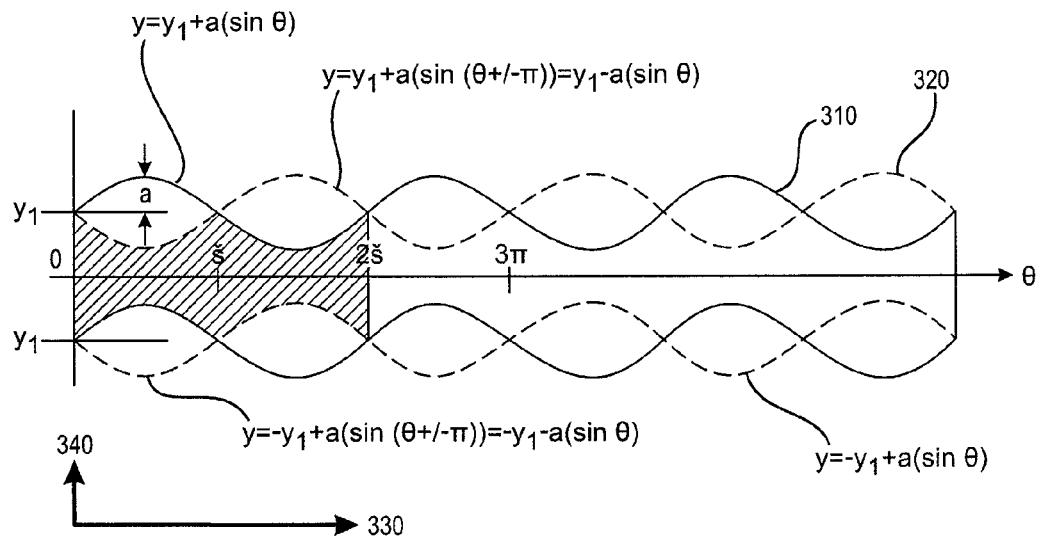
FIGS. 3A and 3B are used to illustrate the reduced sensitivity of the capacitor of FIG. 3 to misalignment of its plates.

FIG. 3A schematically illustrates a procedure for calculating an overlapping area formed by plates 310 and 320 in the case where the plates are in alignment, wherein the edges of plate 310 are represented by solid lines and those of plate 320 by dashed lines. It will be seen that, because of the repeating sinusoidal pattern formed by plates 310 and 320, to characterize it, it is sufficient to calculate the overlapping area from 0 to $2\pi$ alone, which is cross-hatched in FIG. 3A. Within this interval, it will also be seen that the area is symmetrical about the point ($\pi$, 0) so that the total overlapping area from 0 to $2\pi$ may be obtained as: $4\int(y_1-a(\sin\theta))\,d\theta$, evaluated for the interval 0 to $\pi$, which is $4\pi y_1 - 8a$.

Figure 3B:
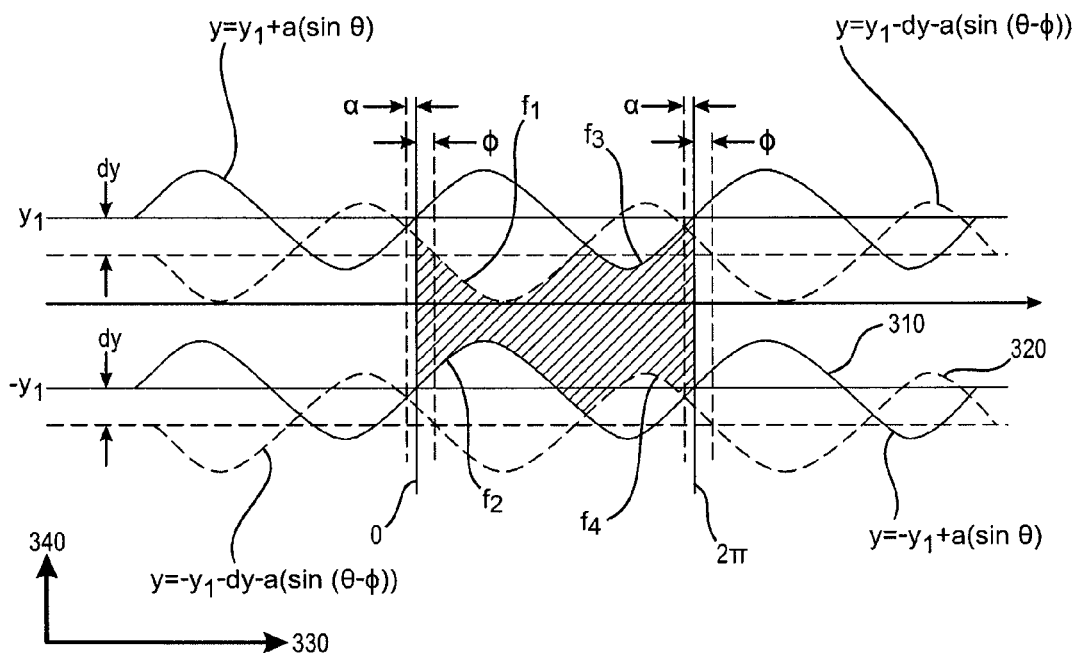

FIG. 3B illustrates the case where the plates 310 and 320 are offset by $\phi$ radians in the longitudinal direction 330 and by dy in the lateral direction 340. In this case, a different illustrative interval of $2\pi$ radians in the direction 330 is evaluated; however, due to the symmetries of the patterns formed by plates 310 and 320, it is immaterial which such interval is selected for this evaluation.

To simplify the calculation of the overlapping area, the area integrals are evaluated over intervals bounded by points where the edges of the plates 310 and 320 intersect in the vertical direction. Due to the offset of $\phi$ radians in the longitudinal direction 330, it will be seen that the edges of plates 310 and 320 intersect in the vertical direction at a position $\alpha$ radians before the origin (selected as the position $\theta=0$ in FIG. 3B). The upper edge of plate 310 corresponds to a curve $y=y_1+a(\sin\theta)$; however, since plate 320 is offset by $\phi$ radians with respect to plate 310, its upper edge corresponds to a curve $y=y_1-dy-a(\sin(\theta-\phi))$. By setting the values of y for both curves equal and substituting $\alpha$ for $\theta$, the value of $\alpha$ can be calculated.

To find the total overlapped area, the following integrals are evaluated, where the functions are identified in FIG. 3B: (1) $\int f_1 d\theta$, over the interval $(-\alpha)$ to $(\pi+\phi+\alpha)$; (2) $\int f_2 d\theta$, over the same interval as $f_1$; (3) $\int f_3 d\theta$, over the interval $(\pi+\phi+\alpha)$ to $(2\pi-\alpha)$; and $\int f_4 d\theta$, over the same interval as $f_3$. When terms are combined, the total area is expressed as $4y_1\pi-2dy\phi-4dy\alpha-4a(\cos\alpha)-4a(\cos(\phi+\alpha))$.

As an example, if it is assumed that the width of each plate 310 and 320 is 20 mils, so that $y_1=10$ mils; that the sine amplitude $a=4$ mils; and that the period of the sinusoidal pattern is 100 mils, so that $\pi$ radians corresponds to 50 mils, where the plates 310 and 320 are in alignment as in FIG. 3A, the overlapping area=$4y_1\pi-8a=(4)(10)(50)-(8)(4)=1968$ mils$^2$. To assess the sensitivity of the FIG. 3 embodiment to misalignment, a lateral offset dy between the plates of 1 mil and a longitudinal offset of 1 mil are introduced into this example. Since the period of the sinusoidal pattern is 100 mils, $\phi=(1/100)(360 \text{ degrees})=3.6$ degrees, and from this value, along with the values of a and dy, the value of $\alpha$ is found to be approximately 5.4 degrees, or about 1.5 mils. Applying the formula for calculating the overlapping area illustrated in FIG. 3B, as set out above, such area is found to be approximately 1972 mils$^2$. Thus, a misregistration of plates 310 and 320 of 1 mil in the direction 330 (the longitudinal direction) and 1 mil in the direction 340 (the lateral direction), results in a change of 1972/1968, or about 0.217 percent in the overlapping area.

In a contrasting example, two rectangular plates are used in place of plates 310 and 320, each of the rectangular plates having a section 20 mils wide by 100 mils long to form an overlapping area of 2000 mils$^2$ when precisely aligned. If, however, the rectangular plates are misaligned to the same extent as plates 310 and 320 of FIG. 3B, that is, by 1 mil in the longitudinal direction and 1 mil in the lateral direction, the overlapping area becomes (19 mils)(99 mils)=1881 mils$^2$. Thus, a misregistration of the two rectangular plates of 1 mil in the longitudinal direction and 1 mil in the lateral direction results in a change of 1881/2000, or 5.95 percent in the overlapping area, which is 5.95/0.217 or about 27 times worse than the embodiment of FIG. 3.

Figure 4:
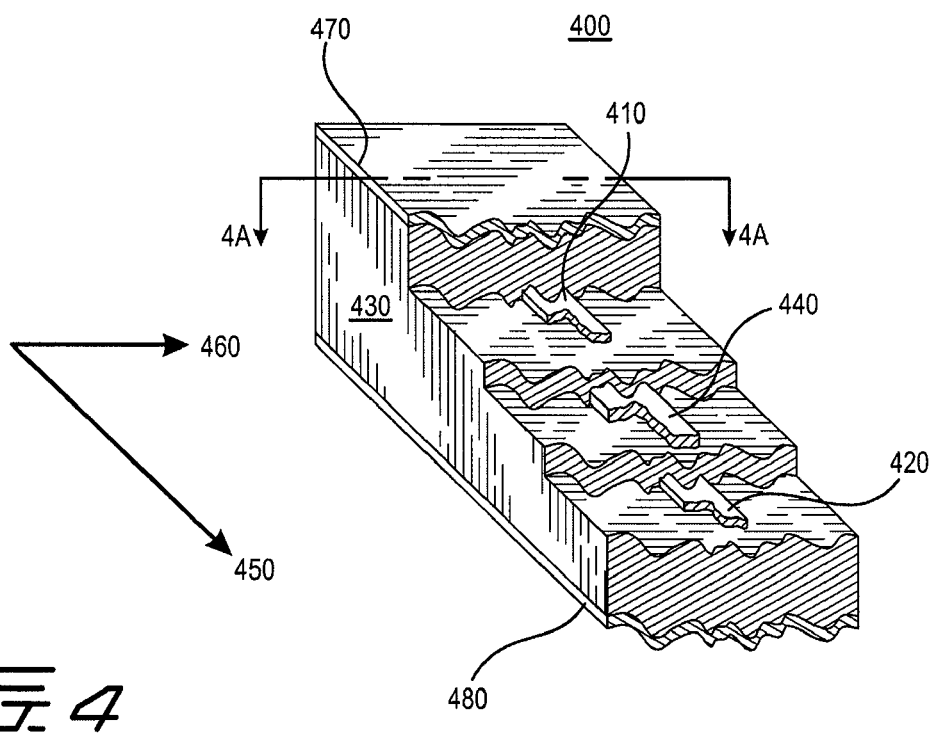
FIG. 4 is a partially broken away, three dimensional view of a capacitor structure of a further embodiment providing reduced sensitivity to misalignment of its plates.

FIG. 4 illustrates a further advantageous embodiment of a capacitor 400 comprising first and second plates 410 and 420, respectively, embedded in a dielectric matrix 430, with a floating equipotential conductor 440 also embedded in the dielectric matrix 430 between plates 410 and 420. Plates 410 and 420, as well as conductor 440, each extends in a longitudinal direction 450 and in a lateral direction 460, and each thereof is electrically isolated from the others by the dielectric material of the matrix 430. Each of plates 410 and 420 and conductor 440 is generally aligned with the others thereof in the longitudinal direction 450 and in the lateral direction 460. A first ground plate 470 is positioned on a top surface of dielectric matrix 430, while a second ground plate 480 is positioned on a bottom surface of dielectric matrix 430. A conductive lead, pattern, pad or connector (not shown for purposes of simplicity and clarity) is connected to each of the plates 410 and 420 for connecting the same to other elements, circuits or the like.

Figure 4A:
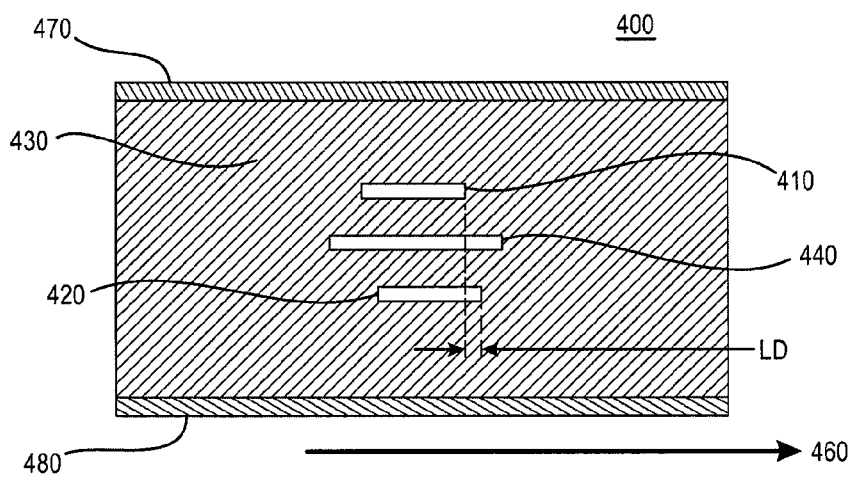
FIG. 4A is a cross-sectional view of the FIG. 4 embodiment.

With reference also to FIG. 4A, which is a cross-sectional view of capacitor 400 along the lines 4A-4A in FIG. 4, it will be seen that floating equipotential conductor 440 has a larger lateral dimension or greater width than either plate 410 or plate 420. Consequently, a misalignment of the plates 410 and 420 in the lateral direction 460 (indicated in FIG. 4A as LD), within limits, will not materially affect the value of the capacitance formed by the structure of capacitor 400, since plates 410 and 420 are shielded from one another by conductor 440. It will also be seen from the disclosure hereof that a misalignment of conductor 440 with either or both of plates 410 and 420, within limits, will not materially affect such capacitance value.

In certain embodiments, floating equipotential conductor 440 has a greater longitudinal dimension than either of plate 410 or plate 420. Although not shown for purposes of simplicity and clarity, in such embodiments, longitudinal midpoints of plates 410 and 420 are aligned generally with a longitudinal midpoint of conductor 440. Thus, any longitudinal misalignment of plate 410 or 420 with respect to conductor 440 or of conductor 440 with respect to either or both of plates 410 and 420, will not, within limits, materially affect the capacitance of capacitor 400.

In certain embodiments, plates 410 and 420 have a generally rectangular configuration in the longitudinal and lateral directions 450 and 460. In certain embodiments, plates 410 and 420 are configured as in FIG. 1 or in FIG. 3, or configured according to a different periodic pattern along the longitudinal directions thereof.

Figure 4B:
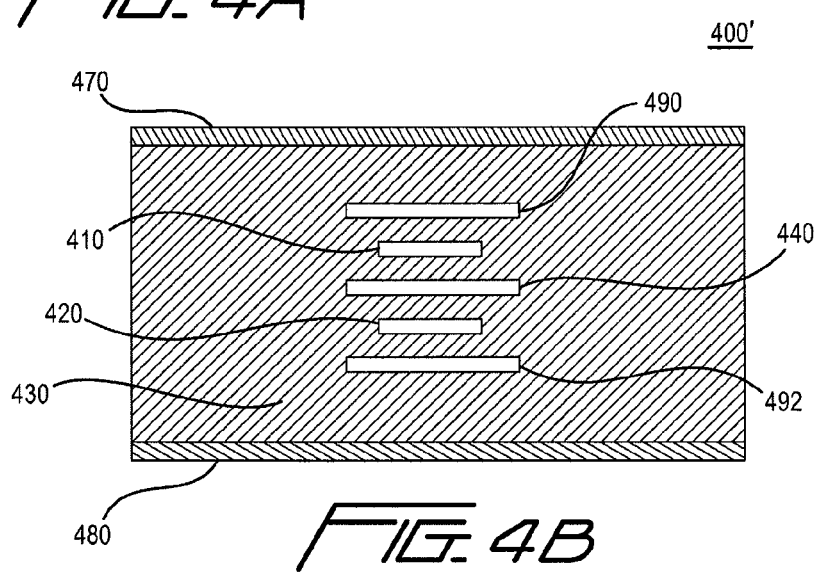
FIG. 4B is a further version of the embodiment of FIG. 4.

FIG. 4B is a cross-sectional view of a modified version of the FIG. 4 embodiment taken in the same direction as the cross-sectional view of FIG. 4A, in which elements in common with the FIG. 4 embodiment have the same reference numerals. In the embodiment of FIG. 4B, additional floating equipotential conductors 490 and 492 are embedded in dielectric matrix 430. Conductor 490 has the same dimensions as conductor 440 and is vertically aligned therewith above plate 410 and separated and electrically isolated therefrom by the dielectric material of matrix 430. Conductor 492 also has the same dimensions as conductor 440 and is vertically aligned therewith below plate 420 and separated and electrically isolated therefrom by the dielectric material of matrix 430. The embodiment of FIG. 4B provides very tight coupling in applications such as hybrid couplers. Preferably, floating equipotential conductors 440, 490 and 492 are connected to each other.

Figure 4C:
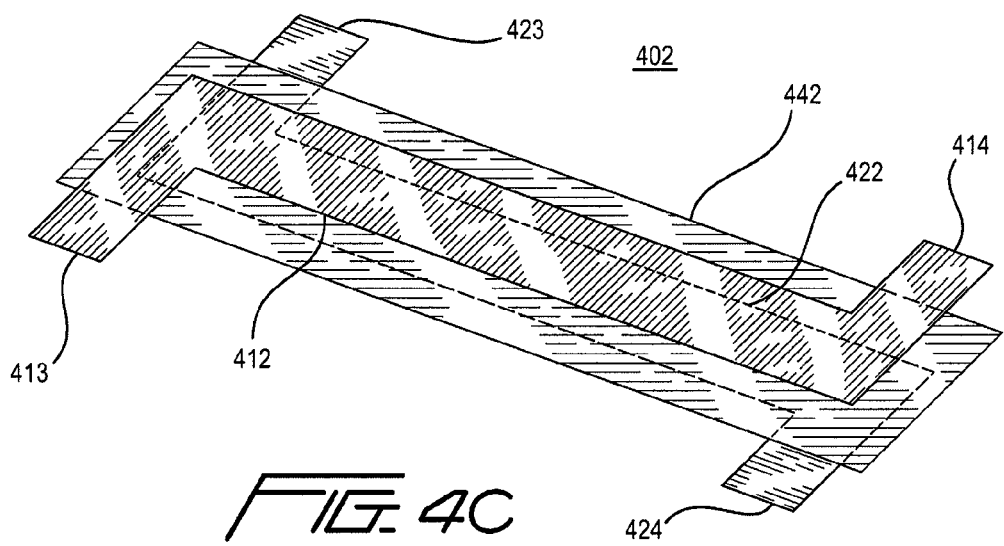
FIG. 4C is a partial, three-dimensional view of a capacitor structure similar to those of FIGS. 4, 4A and 4B, having advantageously arranged connectors.

FIG. 4C illustrates a capacitor 402 similar to capacitors 400 and 400' having an upper plate 412 and a lower plate 422 separated by a floating equipotential conductor 442 electrically isolated from plates 412 and 422 by a dielectric (not shown for purposes of simplicity and clarity). Upper plate 412 has a first connector 413 at a first longitudinal end thereof and a second connector 414 at a second longitudinal end thereof. First connector 413 extends laterally from upper plate 412 in a first lateral direction, while second connector 414 extends laterally from upper plate 412 in a second lateral direction opposite the first lateral direction.

Similarly, lower plate 422 has a third connector 423 at a first longitudinal end thereof proximate the first longitudinal end of upper plate 412 and a fourth connector 424 at a second longitudinal end thereof proximate the second longitudinal end of upper plate 412. Third connector 423 extends laterally from lower plate 422 in the second lateral direction, and so extends in a direction opposite the direction in which first connector 413 extends from upper plate 412. Fourth connector 424 extends laterally from lower plate 422 in the first lateral direction, and so extends in a direction opposite the direction in which second connector 414 extends from upper plate 412.

First connector 413 has a width (measured in the longitudinal direction of upper plate 412) which is substantially the same as a width of second connector 414 (also measured in the longitudinal direction of upper plate 412). Accordingly, a lateral displacement of upper plate 412, within limits, will not change the area by which upper plate 412 overlaps the floating equipotential conductor 442, so that the capacitance formed between upper plate 412 and conductor 442 is substantially unaffected by such lateral displacement. It will also be seen from FIG. 4C that floating equipotential conductor 442 has a longer dimension in the longitudinal direction than upper plate 412 which is positioned longitudinally between longitudinal ends of conductor 442. Accordingly, a longitudinal displacement of upper plate 412, within limits, will not substantially affect the capacitance formed by upper plate 412 and floating equipotential conductor 442.

Third connector 423 has a width (measured in the longitudinal direction of lower plate 422) which is substantially the same as a width of fourth connector 424 (also measured in the longitudinal direction of lower plate 422). Accordingly, a lateral displacement of lower plate 422, within limits, will not change the area by which lower plate 422 overlaps the floating equipotential conductor 442, so that the capacitance formed between lower plate 422 and conductor 442 is substantially unaffected by such lateral displacement. It will also be seen from FIG. 4C that floating equipotential conductor 442 has a longer dimension in the longitudinal direction than lower plate 422 which is positioned longitudinally between longitudinal ends of conductor 442. Accordingly, a longitudinal displacement of lower plate 422, within limits, will not substantially affect the capacitance formed by lower plate 422 and floating equipotential conductor 442.

Moreover, it will be seen that, although the first and third connectors 413 and 423, respectively, are located proximate to the same longitudinal end of the structure of FIG. 4C, first connector 413 and third connector 423 extend in opposite directions from the upper plate 412 and the lower plate 422, respectively. In addition, it will also be seen that, although the second and fourth connectors 414 and 424, respectively, are located proximate to the same longitudinal end of the structure of FIG. 4C, second connector 414 and fourth connector 424 extend in opposite directions from the upper plate 412 and the lower plate 422, respectively. Consequently, the structure of FIG. 4C ensures that substantially the only coupling between upper plate 412 and lower plate 422 occurs within the area defined by the floating equipotential conductor 442. The structure of FIG. 4C, when used as a hybrid coupler thus affords advantageously high reverse isolation.

In certain embodiments, the capacitors 400 and 400' are manufactured using the techniques described above in connection with FIGS. 2A through 2C, while in certain embodiments, capacitors 400 and 400' are manufactured using a different manufacturing process.

A capacitor comprises a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; a dielectric separating the first plate from the second plate; and a floating equipotential conductor positioned between the first and second plates and having a dimension in the second direction exceeding dimensions of the first and second plates in the second direction. In certain embodiments, the floating equipotential conductor has a dimension in the first direction exceeding dimensions of the first and second plates in the first direction.

Figure 5:
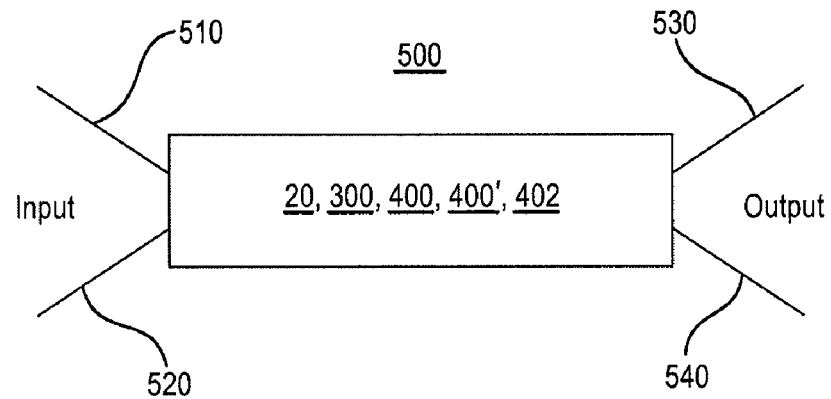
FIG. 5 is a schematic representation of a transmission line comprising any of the embodiments of FIGS. 1, 3, 4, 4B and 4C.

FIG. 5 schematically illustrates an application of any of the structures 20, 300, 400, 400' and 402 of FIGS. 1, 3, 4, 4B and 4C as a broadside coupled transmission line 500 comprising a first input connector 510 connected to a first end of plate 30, 310, 410 or 412, as the case may be, and a second input connector 520 connected to a first end of plate 40, 320, 420 or 422 as appropriate. Transmission line 500 also comprises a first output connector 530 connected to a second end of plate 30, 310, 410 or 412, as the case may be, and a second output connector 540 connected to a second end of plate 30, 310, 410 or 412 as appropriate.

The structures 20, 300, 400, 400' and 402 of FIGS. 1, 3, 4, 4B and 4C find applications at microwave frequencies in hybrids, directional couplers, filters, attenuators, baluns, and phase shifters. An embodiment of a balanced amplifier 600 comprising any of such structures used as a hybrid coupler is illustrated schematically in FIG. 6 in which a first such hybrid coupler is indicated as 505 and a second as 506. An input of the balanced amplifier 600 is connected to port 1 of hybrid coupler 505, while port 2 of hybrid coupler 505, as the direct or transmitted port, is connected to an input of an amplifier 640. Port 3 of hybrid coupler 505, as the coupled port, is connected to an input of an amplifier 630, while port 4 of hybrid coupler 505 is connected to a first terminal of a 50Q termination resistor 650, whose second terminal is connected to ground.

Port 1 of hybrid coupler 506 is connected to an output of amplifier 630, while port 2 of hybrid coupler 506 supplies the output of the balanced amplifier 600. Port 3 of hybrid coupler 506 is connected to a first terminal of a 50Ω termination resistor 660, whose second terminal is connected to ground, while port 4 of hybrid coupler 506 is connected to an output of amplifier 640.

Figure 6:
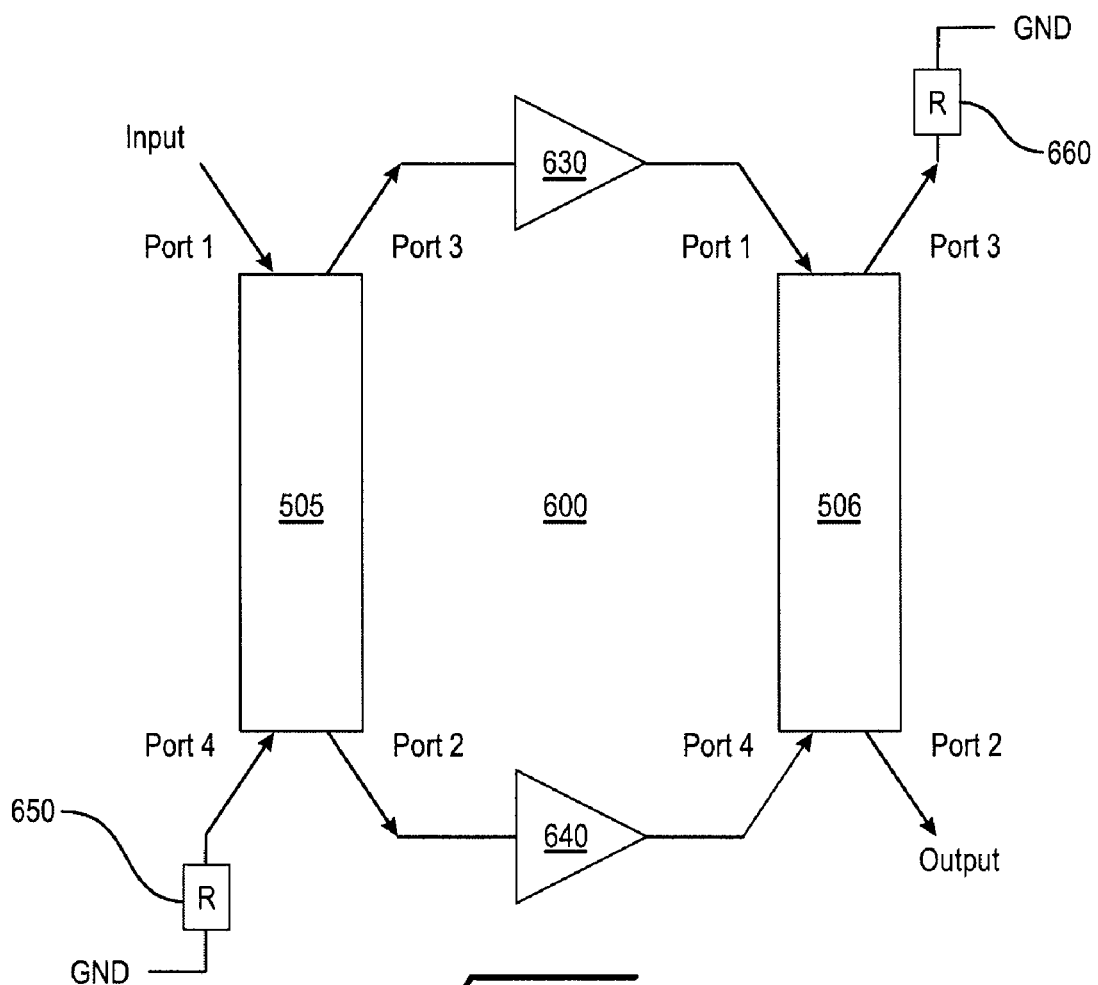
FIG. 6 is a schematic representation of a balanced amplifier making use of hybrid couplers comprising any of the embodiments of FIGS. 1, 3, 4, 4B and 4C.

The structures of FIGS. 1, 3, 4, 4B and 4C are particularly useful in devices, such as balanced amplifier 600 of FIG. 6, which require very tight electrical coupling between the coupled lines of the capacitor structures. However, devices that provide such tight coupling are very sensitive to a plate misalignment in the capacitor structure resulting in a deviation of the capacitance value from the design value. The capacitor structures of FIGS. 1, 3, 4, 4B and 4C substantially reduce the dependence of the capacitance value on the alignment of the plates, so that misalignment thereof, within limits, will improve the manufacturing yield for devices of this kind.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A capacitor, comprising: a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; and a dielectric separating the first plate from the second plate; the first plate having at least one first portion and at least one second portion displaced longitudinally from the at least one first portion, the at least one portion of the first plate being displaced in the second direction relative to the at least one second portion of the first plate; the second plate having at least one first portion and at least one second portion displaced longitudinally from the at least one first portion, the at least one portion of the second plate being displaced in the second direction relative to the at least one second portion of the second plate; the first portion of the first plate being aligned longitudinally at least partially with the first portion of the second plate to define a first opposing area; the second portion of the first plate being aligned longitudinally at least partially with the second portion of the second plate to define a second opposing area; the first portions of the first and second plates being displaced in the second direction from each other and the second portions of the first and second plates being displaced in the second direction from each other.

2. A capacitor, comprising: a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; and a dielectric separating the first plate from the second plate; the first plate and the second plate each having first longitudinally extending portions displaced laterally and longitudinally from second longitudinally extending portions thereof such that the first and second longitudinally extending portions form a periodic pattern of laterally displaced areas extending along the longitudinal direction; the periodic pattern of the first longitudinally extending portion being displaced by $\pi$ radians from the periodic pattern of the second longitudinally extending portion with or without a further longitudinal displacement due to misalignment of the first and second plates.

3. A capacitor, comprising: a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; and a dielectric separating the first plate from the second plate; each of the first and second plates being displaced in the second direction in a periodically repeating pattern along an extent thereof in the first direction such that the periodic patterns of the first and second plates have a phase difference of substantially $\pi$ radians along the first direction with or without a further displacement in the first direction due to misalignment of the first and second plates.

4. A method of manufacturing a capacitor, comprising: placing or forming a first plate in or on a dielectric substrate, the first plate extending longitudinally in a first direction in or on the dielectric substrate and in a second direction perpendicular to the first direction; placing or forming a dielectric material on the first plate; and placing or forming a second plate in or on the dielectric material, so that the second plate extends longitudinally in the first direction of the dielectric substrate and in the second direction perpendicular to the first direction, so that the second plate is separated from the first plate by the dielectric material and at least a portion of the second plate is arranged opposite at least a portion of the first plate; each of the first and second plates being displaced in the second direction in a periodically repeating pattern along an extent thereof in the first direction such that the periodic patterns of the first and second plates have a phase difference of substantially $\pi$ radians along the first direction with or without a further displacement in the first direction due to misalignment of the first and second plates.

5. A capacitor, comprising: a first plate extending longitudinally in a first direction and in a second direction perpendicular to the first direction; a second plate extending longitudinally in the first direction and in the second direction perpendicular to the first direction; at least a portion of the first plate being arranged opposite at least a portion of the second plate; a dielectric separating the first plate from the second plate; and a floating equipotential conductor positioned between the first and second plates and having a dimension in the second direction exceeding dimensions of the first and second plates in the second direction.

6. The capacitor of claim 5, wherein the floating equipotential conductor has a dimension in the first direction exceeding dimensions of the first and second plates in the first direction.

* * * * *